United States Patent [19]

Okawa et al.

[11] Patent Number: 4,618,337
[45] Date of Patent: Oct. 21, 1986

[54] V-BELT ASSEMBLY FOR TRANSMITTING POWER

[75] Inventors: Susumu Okawa, Numazu; Yasunobu Jufuku, Susono, both of Japan

[73] Assignee: Toyota Jidosha Kabushiki Kaisha, Toyota, Japan

[21] Appl. No.: 662,617

[22] Filed: Oct. 19, 1984

[30] Foreign Application Priority Data

| Oct. 26, 1983 | [JP] | Japan | 58-199240 |
| Oct. 26, 1983 | [JP] | Japan | 58-164548[U] |
| Oct. 26, 1983 | [JP] | Japan | 58-164549[U] |
| Nov. 30, 1983 | [JP] | Japan | 58-183823[U] |
| Dec. 2, 1983 | [JP] | Japan | 58-185785[U] |
| Dec. 2, 1983 | [JP] | Japan | 58-185786[U] |
| Dec. 2, 1983 | [JP] | Japan | 58-185787[U] |
| Dec. 2, 1983 | [JP] | Japan | 58-185788[U] |
| Dec. 2, 1983 | [JP] | Japan | 58-185790[U] |

[51] Int. Cl.$^4$ .................... F16G 5/16; F16G 5/18; F16G 5/22
[52] U.S. Cl. ................ 474/201; 474/242; 474/244
[58] Field of Search ........... 474/201, 204, 206, 207, 474/237, 238, 242, 244, 264, 265

[56] References Cited

U.S. PATENT DOCUMENTS

| 4,080,841 | 3/1978 | Vollers | 474/201 |
| 4,177,687 | 12/1979 | Russ, Sr. | 474/242 |
| 4,365,965 | 12/1982 | Russ, Sr. | 474/244 |
| 4,457,742 | 7/1984 | Hattori et al. | 474/201 |
| 4,512,753 | 4/1985 | Hattori | 474/201 X |
| 4,525,160 | 6/1985 | Okawa et al. | 474/242 |
| 4,526,561 | 7/1985 | Hattori | 474/242 |

Primary Examiner—John Petrakes
Attorney, Agent, or Firm—Oblon, Fisher, Spivak, McClelland & Maier

[57] ABSTRACT

A V-belt assembly for transmitting power, which includes a V-belt assembly trained over a V-belt wheel; a flexible endless belt; a plurality of suspension members slidably mounted on the endless belt in a longitudinal direction thereof and which includes a pin member and a U-shaped member connected to said pin, and a plurality of U-shaped transmission pieces separated from the U-shaped member, having side surfaces corresponding to side walls of a V-shaped groove of the V-belt wheel and supported swingably by the suspension members, respectively.

43 Claims, 39 Drawing Figures

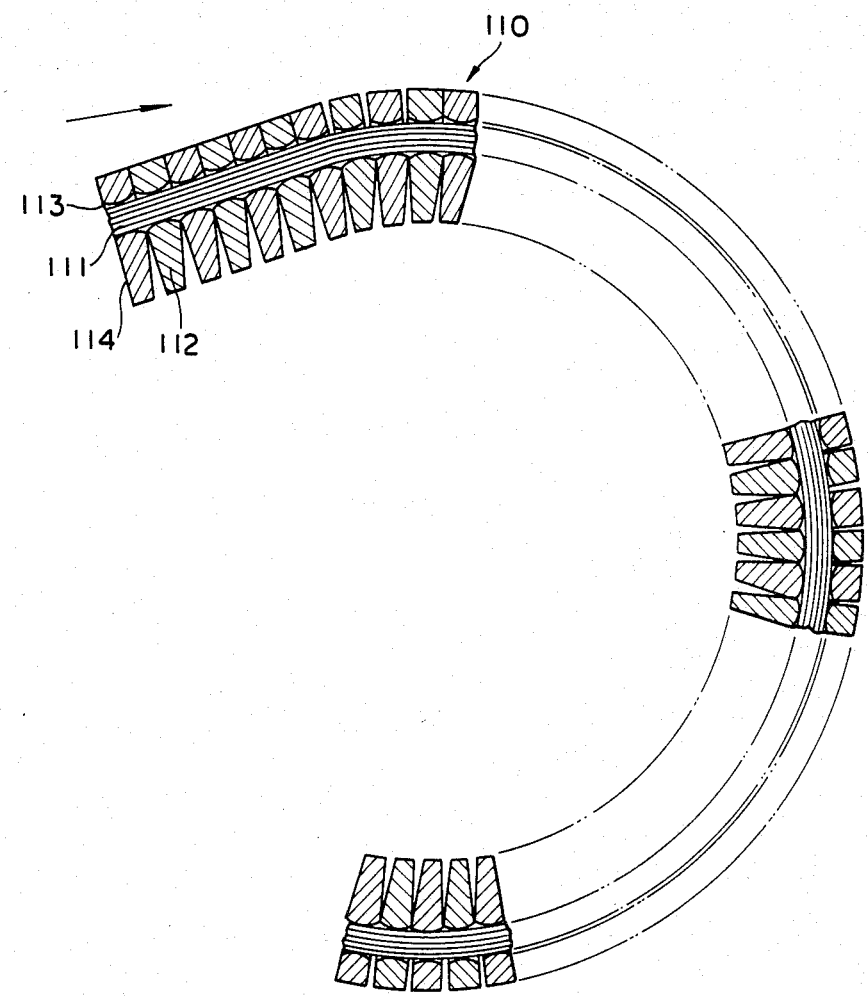
FIG. I
*PRIOR ART*

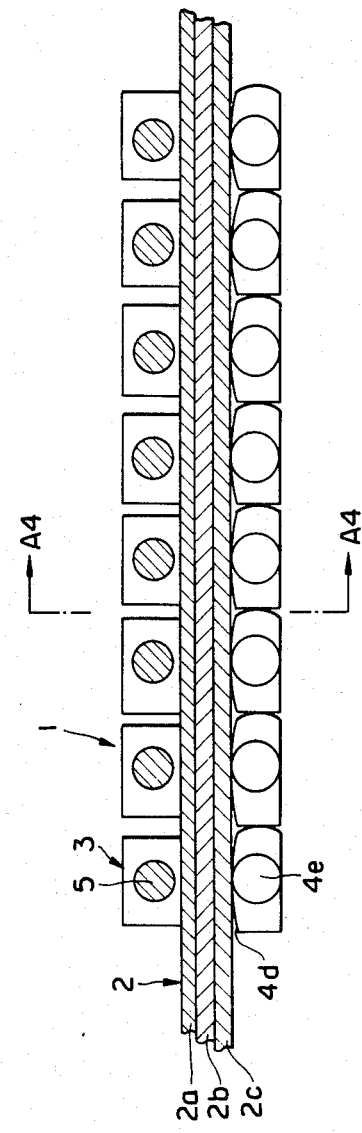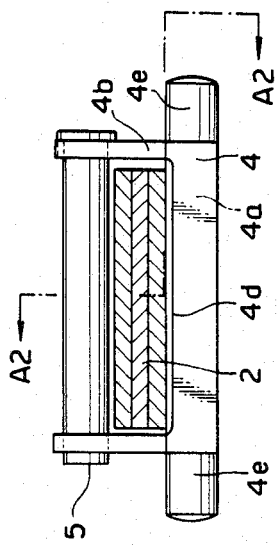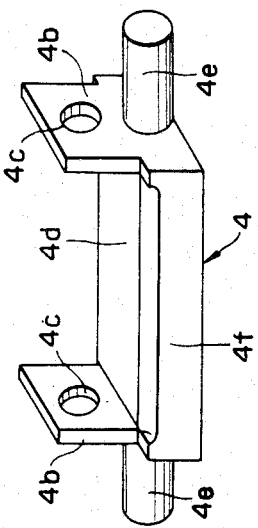

FIG.13  FIG.14
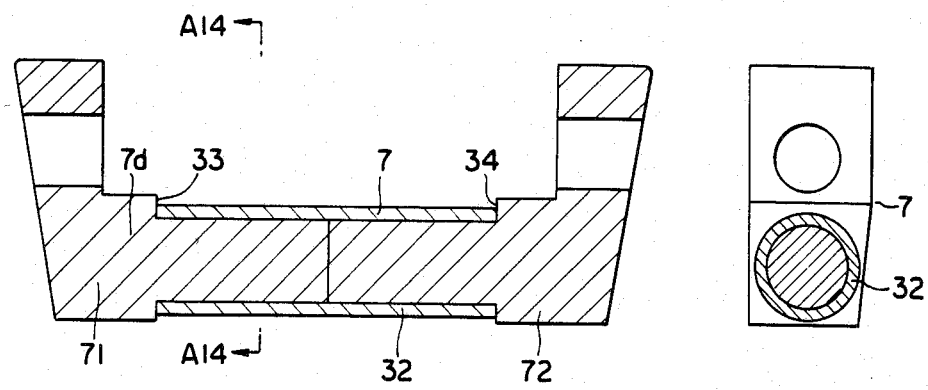
FIG.15
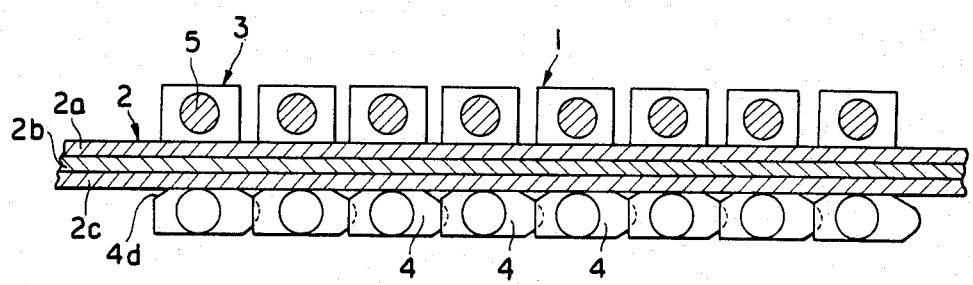
FIG.16a  FIG.16b
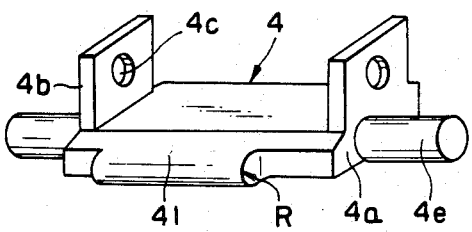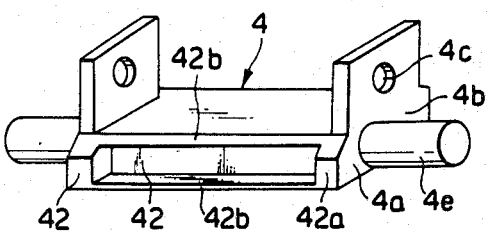

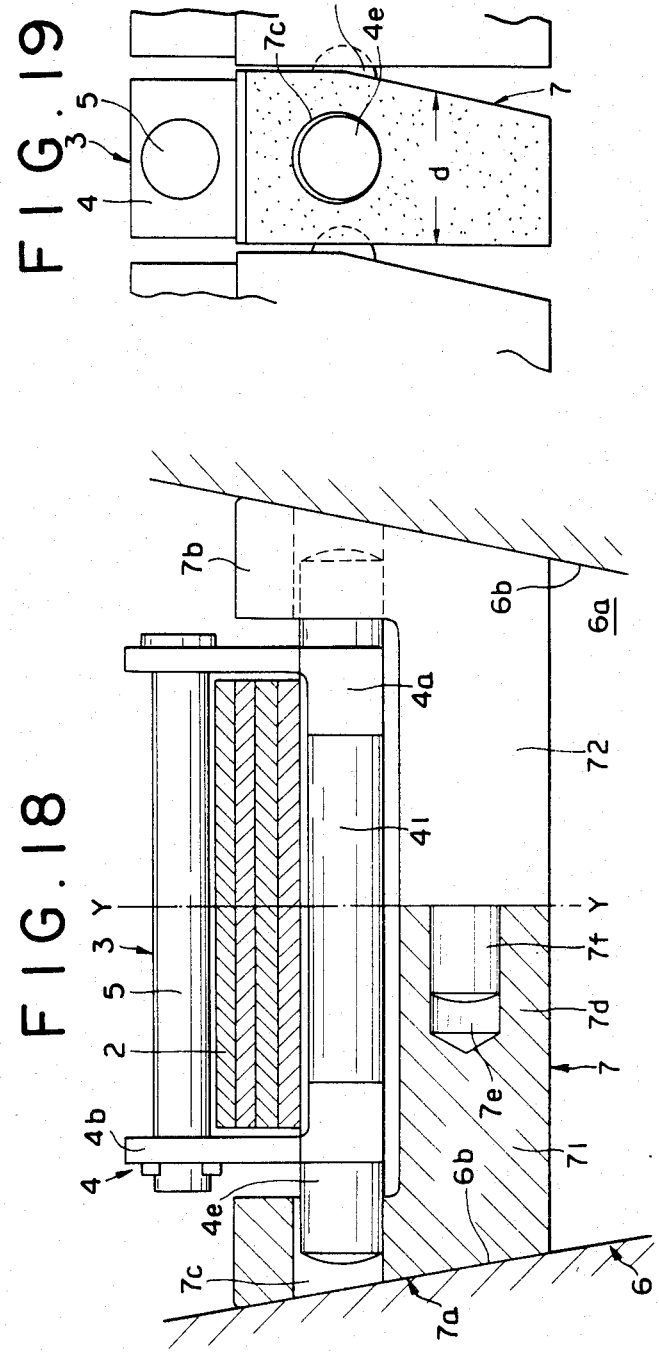

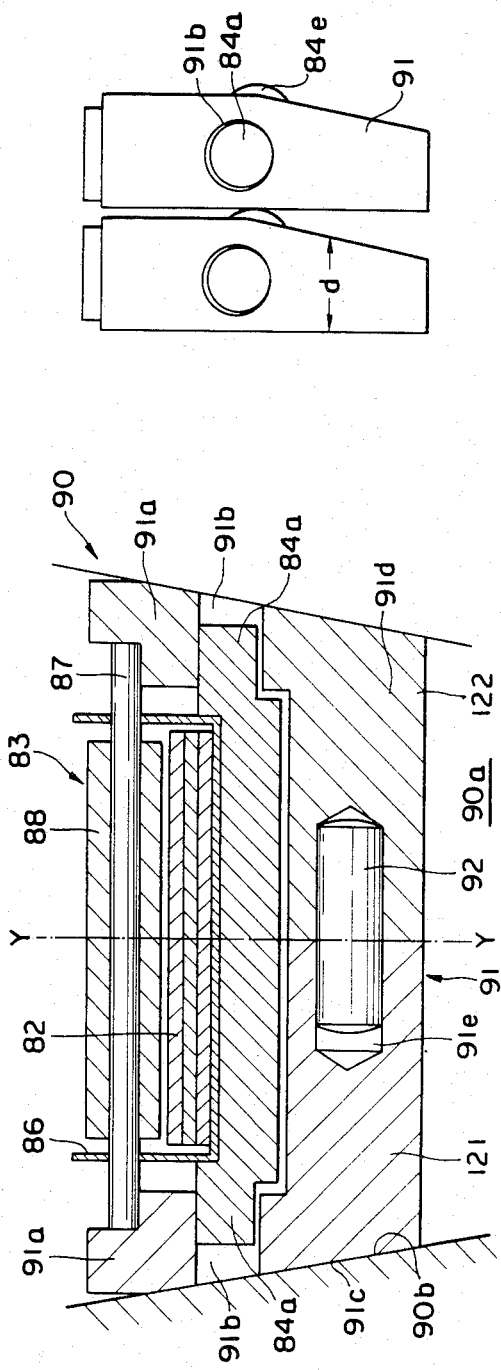

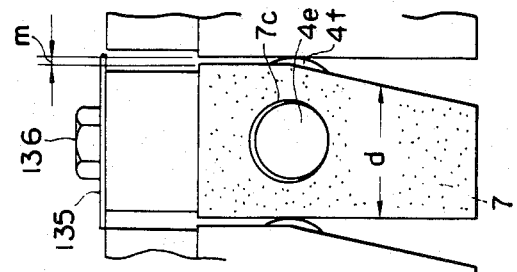
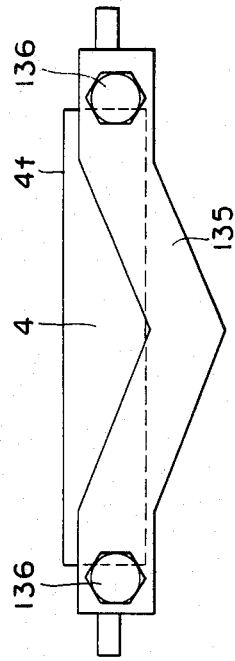
FIG. 33
FIG. 34
FIG. 35

V-BELT ASSEMBLY FOR TRANSMITTING POWER

BACKGROUND OF THE INVENTION

1. Field of the Invention

This invention relates to a V-belt assembly for transmitting power trained over a V-belt wheel.

2. Description of the Prior Art

A V-belt assembly for transmitting power comprising a plurality of metal members mounted on an endless belt made of metal slidably in the longitudinal direction thereof is well known from the laid-open Japanese Patent No. Sho 55-6783. FIG. 1 shows such a V-belt assembly 110 in which a flexible endless belt 111 constituted from a plurality of overlapped metal strips extends through a plurality of metal members 112. The wall of hole 113 of the metal member 112 through which the endless belt 111 extends are rounded at the center side of the curvature of the endless belt.

In such a constitution, however, an excessive bending stress acts on the endless metal belt 111 by a slanting motion of the metal member 112 to degrade remarkably the durability of the belt. Also, in the slanting motion of the metal member 112, a slip is produced on contact surfaces 114 of the metal members themselves to reduce the efficiency of transmission, and the durability of the belt transmission assembly is degraded by the wear of contact surface 114 of the metal member. Further, the efficiency of transmission is degraded by an inclusion loss produced when the metal member 112 is included into the V-shaped groove of the belt wheel, and the durability is reduced by the slip on meshing surfaces.

SUMMARY OF THE INVENTION

An object of the present invention is to provide a V-belt assembly for transmitting power which is to restrain bending a stress applied on an endless belt to improve the durability of the endless belt.

Another object of the present invention is to provide the V-belt assembly for transmitting power which prevents members attached to the endless belt to be in contact with each other in the longitudinal direction thereof from a slip to improve the durability of the members and the efficiency of transmission.

Still another object of the present invention is to provide the V-belt assembly for transmitting power which is to reduce the inclusion loss of members attached to the endless belt to be in contact with each other in the longitudinal direction thereof when the members are included into the belt wheel, and is to restrain a slip on the meshing surfaces of the member and the belt wheel.

Thus, the V-belt assembly according to the present invention comprises a flexible endless belt, a plurality of suspension members mounted on the endless belt slidably in the longitudinal direction thereof and transmission pieces having sides corresponding to the side walls of a V-shaped groove of a V-belt wheel and supported swingably by the supension members respectively.

Further, the V-belt assembly according to the present invention comprises a flexible endless belt, a plurality of suspension members mounted on the endless belt slidably in the longitudinal direction thereof and approximately U-shaped transmission pieces having sides corresponding to the side walls of the V-shaped groove of the V-belt wheel and supported swingably by the suspension members respectively, the transmission piece being constituted from two L-shaped pieces divided by the longitudinal center plane of the endless belt and connected to each other at the bottom side of the U-shaped transmission piece. The V-shaped belt assembly is to be very easily assembled by dividing the transmission piece into two pieces.

The V-belt assembly according to the present invention comprises a flexible endless belt, a plurality of frame type suspension members mounted on the endless belt slidably in the longitudinal direction thereof and transmission pieces having sides corresponding to the side walls of the V-shaped groove of the V-belt wheel and supported swingably by the suspension members, respectively, the suspension member being formed on one end face of the bottom with a projection and on the other end face with a side engaging means engaging at least both sides of the projection. Thus, the adjacent U-shaped members are not displaced laterally to each other so that the efficiency of transmission of drive power is improved.

The V-belt assembly according to the present invention comprises a flexible endless belt, a plurality of frame type suspension members surrounding the endless belt and slidable in the longitudinal direction thereof and transmission pieces supported swingably by these suspension members respectively and capable of engaging the V-shaped groove of the V-belt wheel, each suspension member consisting of an U-shaped member and a pin extending through both side legs of the U-shaped member, a plurality of pivotal projections projecting sideways from both sides of the U-shaped member being fitted in holes of both side legs of the approximately U-shaped transmission piece surrounding a portion of the U-shaped member to support swingably the transmission piece, and a distance between the side leg of the U-shaped member and the side leg of the transmission piece being smaller than that between the end of the pivotal projection of the U-shaped member and the side wall of the V-shaped groove of the V-shaped belt wheel. As a result, any situation wherein the end of the pivotal projection abuts against the side wall of the V-shaped groove of the V-belt wheel to wear or damage the side wall when the U-shaped member moves sideways relative to the transmission piece is to be avoided.

According to the present invention, the axes of pivotal projections projecting sideways from both sides of both side legs of the U-shaped member to support the transmission piece are located on the extension of contact surface between the bottom side of the U-shaped member and the endless belt. As a result, the U-shaped member and transmission piece in the slanting motion will hardly move relative to the endless belt so that the wear due to the relative friction is to be avoided. Also, the slanting transmission piece or U-shaped member will not push up the endless belt so that the slanting motion is smoothed without any large bending stress applied on the endless belt.

The V-belt assembly according to the present invention comprises a flexible endless belt, a plurality of frame type suspension members surrounding the endless belt and are movable in the longitudinal direction thereof and transmission pieces supported swingably by these suspension members and capable of engaging the V-shaped groove of the V-shaped wheel, each suspension member being constituted from a rigid cross member having on both sides pivotal projections for supporting the transmission piece, an U-shaped leaf spring member having the bottom side secured fixedly to the cross member and a pin extending through both side legs of the U-shaped leaf spring member to surround the endless belt together with the leaf spring member. In the range of the belt assembly covering the belt wheel, the belt assembly bends forcibly the bottom side of the leaf spring member upward concavely by using the fact that the U-shaped leaf spring member is pulled out of the cross member upward so that the endless belt on the bottom side is to be bent and brought to the center of the suspension member.

The V-belt assembly according to the present invention comprises a flexible endless belt, a plurality of suspension members surrounding the endless belt and slidable in the longitudinal direction thereof and transmission pieces capable of engaging the V-shaped groove of the V-belt wheel, each suspension member consisting of an U-shaped member and a pin extending through both side legs of the U-shaped member and at least one of the U-shaped members having the thickness larger than that of the other U-shaped members in the longitudinal direction of the endless belt. By using the larger thickness of the U-shaped member a gap between the adjacent suspension members on the endless belt is to be eliminated so that the possibility of noise and wear caused by the mutual collision of the suspension members are to be avoided.

The V-belt assembly according to the present invention comprises a flexible endless belt, a plurality of frame type suspension members surrounding the endless belt and slidable in the longitudinal direction thereof and transmission pieces supported swingably by these suspension members and capable of engaging the V-shaped groove of the V-belt wheel, each suspension member being constituted from an U-shaped member and a spanning angle plate member spanning both side legs of the U-shaped member and projecting in the longitudinal direction of the endless belt. Thus the adjacent U-shaped members in the longitudinal direction of the endless belt are not deviated laterally to each other so that the side leg of the U-shaped member is not in contact with the side edge of the endless belt to prevent the endless belt from wear.

The V-belt assembly according to the present invention comprises a flexible endless belt, a plurality of frame type suspension members surrounding the endless belt and slidable in the longitudinal direction thereof and transmission pieces supported swingably by these suspension members respectively and capable of engaging the V-shaped groove of the V-belt wheel, each suspension member consisting of an U-shaped member and a pin extending through both side legs of the U-shaped member and the surface of the bottom side of the U-shaped member facing the endless belt projecting convexly toward the central portion of the bottom side with a specified curvature. As a result, according to the principle that a plain belt is wound around a belt wheel to bring the longitudinal center to the highest point or the largest diameter point, the longitudinal center plane of the endless belt tends to occupy the highest position of the curved surface. Thus, the side edges of the endless belt is not in contact with the side legs of the U-shaped member so that the wear caused by this contact is prevented to improve the durability of the endless belt.

The accompanying drawings, which are incorporated in and constitute part of this specification, illustrate embodiments of the invention and together with the description, serve to explain the principles of the invention.

BRIEF DESCRIPTION OF THE DRAWINGS

FIG. 1 is a partially cut-away side view showing a prior art V-belt assembly;

FIG. 2 is a sectional view of the V-belt assembly according to the present invention taken along line A2—A2 in FIG. 4 with suspension members being cut away;

FIG. 3 is a perspective view showing the suspension member with a pin being cut away;

FIG. 4 is a sectional view of the V-belt assembly taken along line A4—A4 in FIG. 2;

FIGS. 9 to 13 are sectional views showing the modifications of transmission piece perpendicular to the dividing plane thereof;

FIG. 14 is a sectional view of the transmission piece taken along line A14—A14 in FIG. 13;

FIG. 15 is a sectional view taken along line A15—A15 in FIG. 17 showing another embodiment of the V-belt assembly according to the present invention;

FIG. 16a and 16b are perspective views showing the suspension member in FIG. 15 with the pin being cut away;

FIG. 17 is a front view showing the suspension member in FIG. 15;

FIG. 18 is a front view showing the embodiment in FIG. 15 trained over the V-belt wheel;

FIG. 19 is a side view showing the embodiment in FIG. 15;

FIG. 26 is a cross-sectional view showing the embodiment in FIG. 23;

FIG. 27 is a side view showing the embodiment in FIG. 23;

FIG. 33 is a plan view showing the U-shaped member of the embodiment in FIG. 32;

FIG. 34 is a cross-sectional view taken along line A34—A34 in FIG. 32;

FIG. 35 is a side view showing the embodiment in FIG. 32;

DESCRIPTION OF PREFERRED EMBODIMENTS

Figure 6:
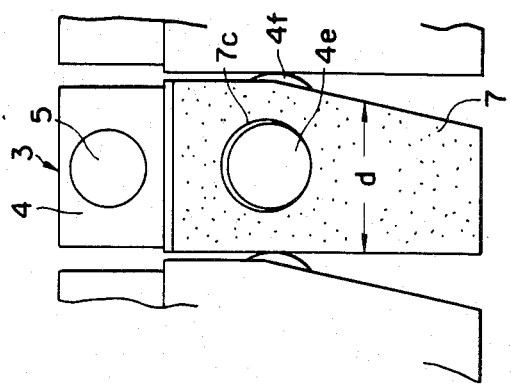
FIG. 6 is a side view showing the suspension members and transmission pieces.
Figure 5:
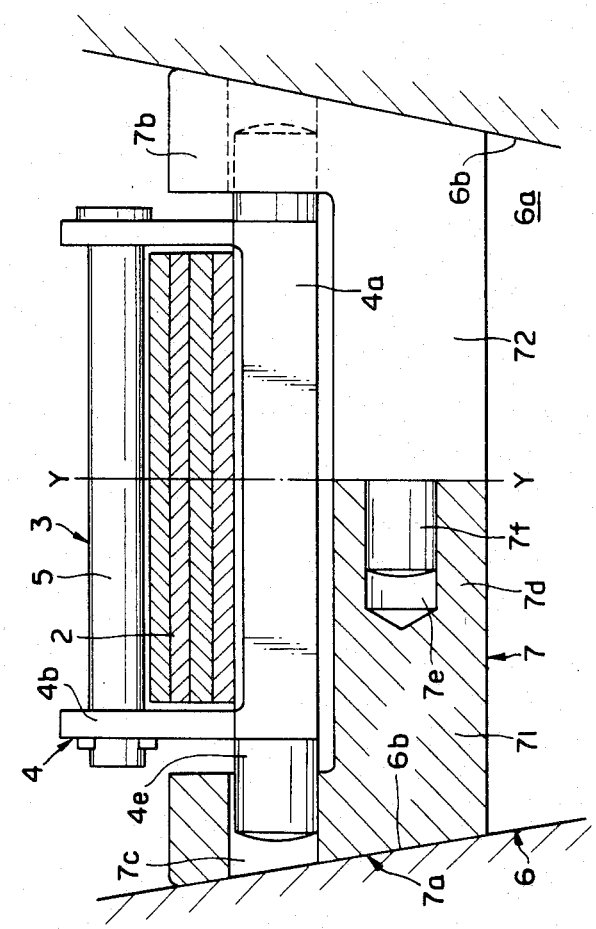
FIG. 5 is a partially cut-away front view showing the V-belt assembly trained over a V-belt wheel.

In FIGS. 2 to 6, on an endless belt 2 of a V-belt assembly 1 comprising three-layered flexible strips 2a to 2c of metal or cloth for example are mounted a plurality of frame type suspension members 3 surrounding the endless belt and slidable in the longitudinal direction thereof. These suspension members 3 have respectively rigid metal or ceramic U-shaped member 4, and the endless belt 2 is located on the bottom side 4a of the U-shaped member between both side legs 4b so that the section of the endless belt is surrounded by a pin 5 extending through holes 4c in the side legs 4b. The upper surface of the bottom side 4a, i.e. the surface 4d being in contact with the endless belt 2, as seen in FIG. 2, is rounded in the longitudinal direction of the endless belt 2 so that when the suspension member 3 swings about the axis parallel to the pin 5 the surface 4d is in contact with the endless belt 2 without bending it. The U-shaped member 4 is formed on both sides with pivotal projections 4e projecting sideways from the bottom side 4a, and an approximately U-shaped transmission piece 7 having sides 7a corresponding to the side walls 6b of a V-shaped groove 6a of a V-belt wheel 6 has holes 7c in the side legs 7b so that the pivotal projections 4e of the U-shaped member 4 are fitted in the holes 7c to support swingably the transmission piece 7. As seen in the drawing, the diameter of the hole 7c is rather larger than that of the pivotal projection 4e to produce some play. This transmission piece 7 is also made of rigid metal or ceramic. As is apparent from FIG. 5, the distance between ends of both pivotal projections 4e is smaller than that of the side walls 7a of the transmission piece 7 in the supporting range, i.e. the range of the holes 7c. Therefore, the suspension member 3 is not in contact with the V-belt wheel 6. As is apparent from FIG. 6, the thickness d of the transmission piece in the longitudinal direction of the endless belt 2 converges from at least the range of the holes 7c to the center side of curvature of the endless belt 2. Also, as is apparent from FIG. 5, the U-shaped transmission piece 7 is divided into two L-shaped pieces 71, 72 by the longitudinal center plane Y—Y of the endless belt 2, and a projection 75 formed on one piece 72 in the bottom side 7d of the U-shaped body is press fitted into a hole 7e provided in the other piece 71 to constitute the U-shaped transmission piece 7. The bottom side 4a of the U-shaped member 4 of the suspension member 3 is formed with a contact lug 4f projecting slightly from the transmission piece 7 in one or both longitudinal directions of the endless belt 2 so that the adjacent U-shaped members 4 arranged under the straight condition in the longitudinal direction of the endless belt 2 are in contact with each other at the contact lugs 4f and the transmission pieces 7 are not in contact with each other.

Of course, this contact lug 4f may be omitted so that the thickness of the U-shaped member 4 in the longitudinal direction of the endless belt may be equalized to that of the transmission piece 7 to make adjacent U-shaped member 4 and transmission piece 7 in the longitudinal direction of the endless belt 2 contact each other.

Figure 7:
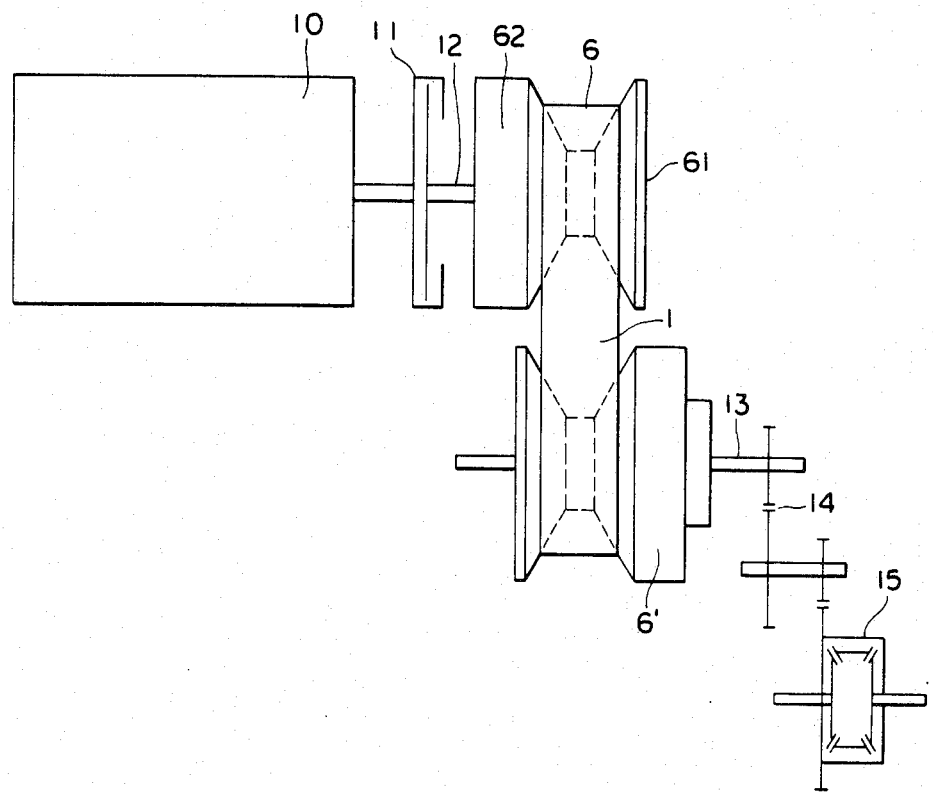
FIG. 7 is a constitutional view showing a drive system of a vehicle having a continuously variable transmission using such a V-belt assembly.

FIG. 7 shows an example of such a V-belt assembly 1 used in a continuously variable transmission for a vehicle, in which an internal combustion engine 10 is capable of being connected to the V-belt drive wheel 6 through a clutch 11. This V-belt wheel 6 is constituted from a disk 61 fixedly coupled to an output shaft 12 of the clutch 11 and a movable disk 62 supported opposedly on the output shaft 12 to move only axially relative to the disk 61. A device for varying the relative distance between the disks 61, 62 is not shown. The V-belt assembly 1 trained over this V-belt drive wheel 6 is also trained over a V-belt driven wheel 6' constituted similarly to the belt wheel 6, and a driven shaft 13 of the belt wheel 6' drives a differential gear 15 through a reduction gear 14.

In operation, the side walls 6b of the V-shaped groove of the drive belt wheel 6 apply a pinching force to both side surfaces 7a of the transmission piece 7 while transmitting a drive force to the transmission piece 7. This drive force is transmitted from the hole 7c in the transmission piece 7 to the pivotal projection 4e of the U-shaped member 4 and through the contact lug 4f of the U-shaped member to the next U-shaped member 4 in the longitudinal direction of the endless belt 2 in the form of a thrust. Thus, the U-shaped member 4 without the range of the drive belt wheel 6 receives sequentially the thrust from the adjacent U-shaped member.

Figure 8:
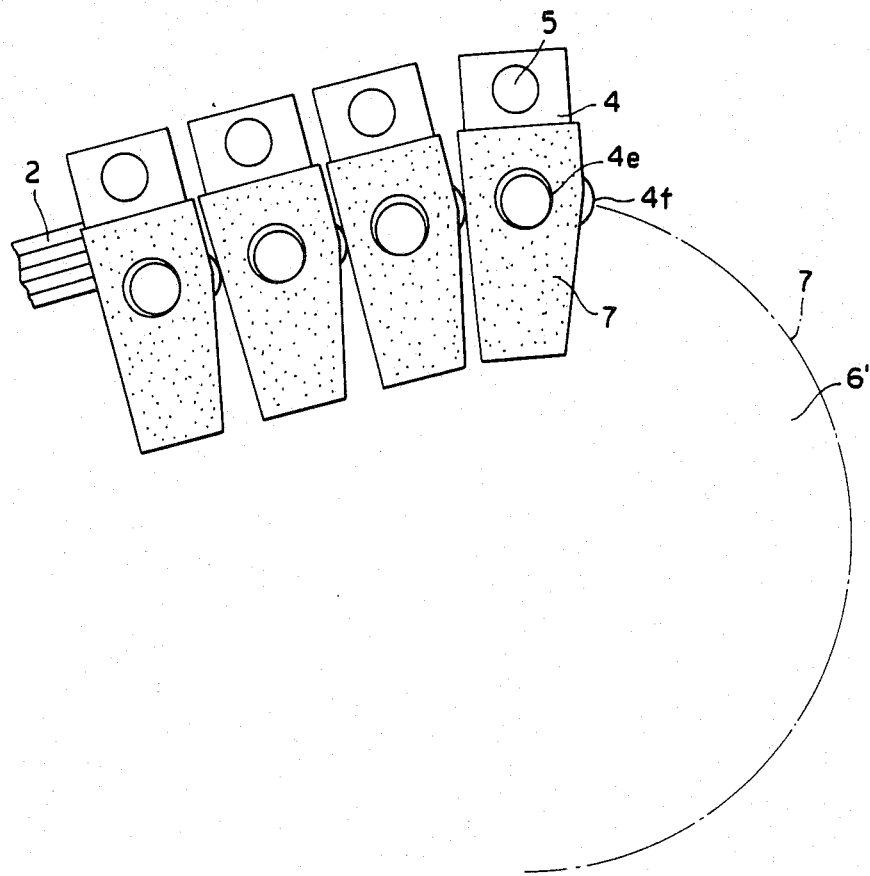
FIG. 8 is a side view showing part of the V-belt assembly trained over the V-belt wheel.

The transmission piece 7 and the U-shaped member 4 just before included in the V-belt driven wheel 6' have to slant to be directed to the center of the V-belt driven wheel 6' as shown in FIG. 8. However, since the transmission piece 7 is supported swingably by the pivotal projection 4e of the U-shaped member through the play, the transmission piece 7 or the U-shaped member does not push up the endless belt 2 with the slanting motion of the transmission piece 7, and since the transmission piece 7 is to slant smoothly, no large bending stresses are applied to the endless belt 2. Thus, an inclusion loss in the V-belt wheel is also reduced. Further, since the relative movement of the transmission piece 7 and the endless belt 2 in the slanting motion of the transmission piece 7 is reduced, the wear of the endless belt 2 is reduced. Furthermore, since the relative slip contact between the adjacent transmission pieces 7 in the slanting motion of the transmission piece 7 is avoided by the contact lug 4f, the wear due to such contact is avoided so as to improve the durability of the V-belt assembly.

Figure 9:
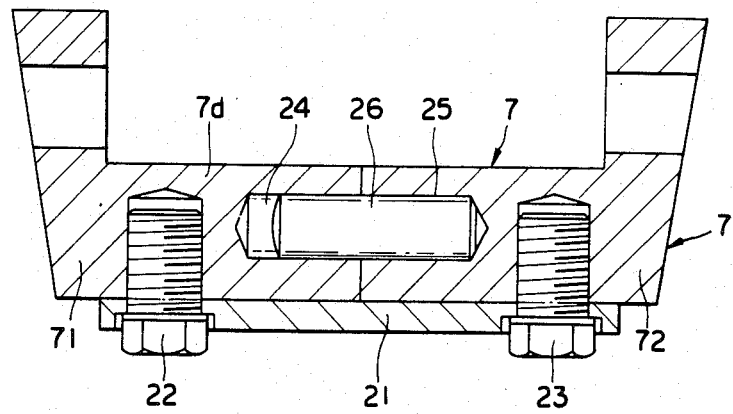

In FIG. 9, a connecting plate 21 is provided which extends over both pieces 71, 72 along the bottom side 7d of the U-shaped transmission piece 7 and is secured fixedly to the pieces 71, 72 respectively with bolts 22, 23. Further, a common positioning pin 26 is to be fitted in blind holes 24, 25 coaxially extending from the butt surfaces of pieces 71, 72 in the bottom side 7d. A spring pin longer than the sum of the lengths of both blind holes 24, 25 may be used for this positioning pin 26.

Figure 10:
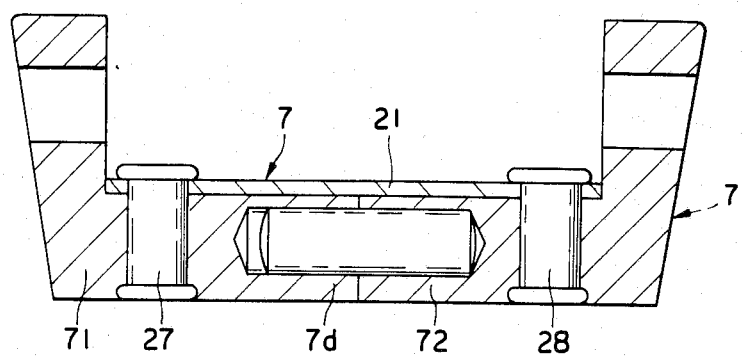

In FIG. 10, instead of the bolts 22, 23 are used rivets 27, 28 and the connecting plate 21 is provided at the endless belt side of the bottom side 7d.

Figure 11:
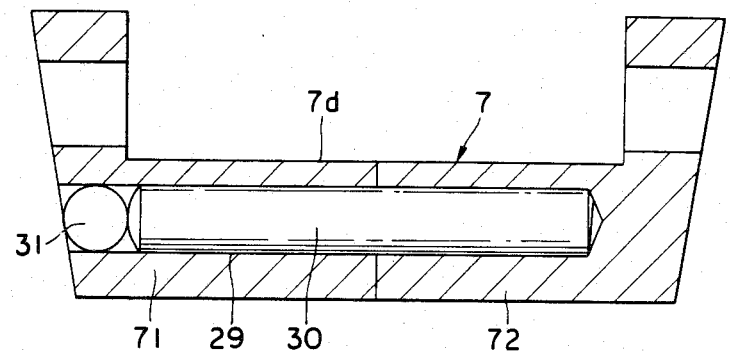

In the constitution shown by FIG. 11, a blind hole 29 in the bottom side 7d of the U-shaped transmission piece 7 is formed to extend from the side of one piece 71 to the other piece 72, a spring pin 30 is inserted in the blind hole 29 and a ball 31 is press fitted in the opening of the blind hole to prevent the drop-out of the spring pin 30 and facilitate the mounting of the spring pin 30. Further, when the pieces 71, 72 are produced, the integral transmission piece 7 is previously made in which the blind hole 29 is provided and then divided into the pieces 71, 72 so that the parallelism of respective surfaces and relative positioning of the pieces 71, 72 are to be very easily attained.

Figure 12:
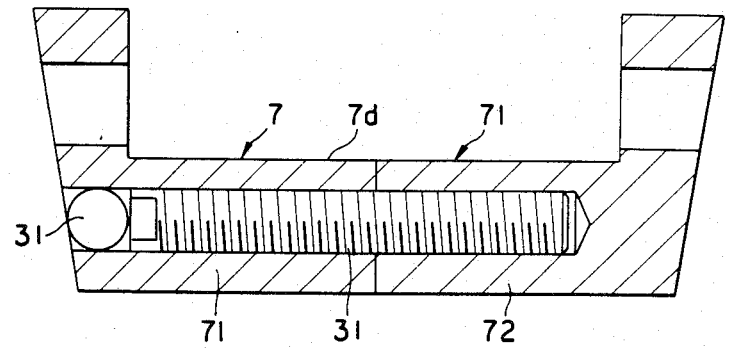

In FIG. 12, a socket bolt 31 is used instead of the spring pin 30 to facilitate the mounting of the pieces 71, 72.

Finally in the constitution shown by FIGS. 13 and 14, the regions of butt surfaces of both pieces 71, 72 in the bottom side 7d of the transmission piece 7 are formed cylindrically and these cylindrical regions are press fitted in one connecting pipe 32 to constitute the transmission piece 7. In this case, to determine the depth of the press fit into both pieces 71, 72, annular shoulders 33, 34 are preferably formed on the pieces 71, 72 as stoppers.

In the V-belt assembly shown by FIGS. 15 to 19, the adjacent U-shaped members 4 on the endless belt 2 mesh with each other to transmit satisfactorily the drive force. Also as best shown in FIGS. 16a and 16b, to prevent the relative lateral displacement of U-shaped members 4, the end face of the bottom side 4a located at the front in the advancing direction is formed with a fin-like projection 41 rounded on the end by a radius R around the axis parallel to the bottom side 4a, and the end face located at the rear is formed with a flat-bottomed recess 42 into which the projection 41 is fitted. Both side walls 42a of the recess 42 engage both sides of the projection 41 to prevent the adacent U-shaped members 4 from the relative lateral displacement. The upper and lower walls 42b of the recess 42 are not necessarily needed, but ensure sufficient engagement of the adjacent U-shaped members 4 even in the relative slanting motion thereof to improve the efficiency of the drive force transmission. In this V-belt assembly, the adjacent U-shaped members are prevented from the relative lateral displacement by the engagement of the projection 41 with the recess 42 to improve the efficiency of the drive force transmission.

Figure 20:
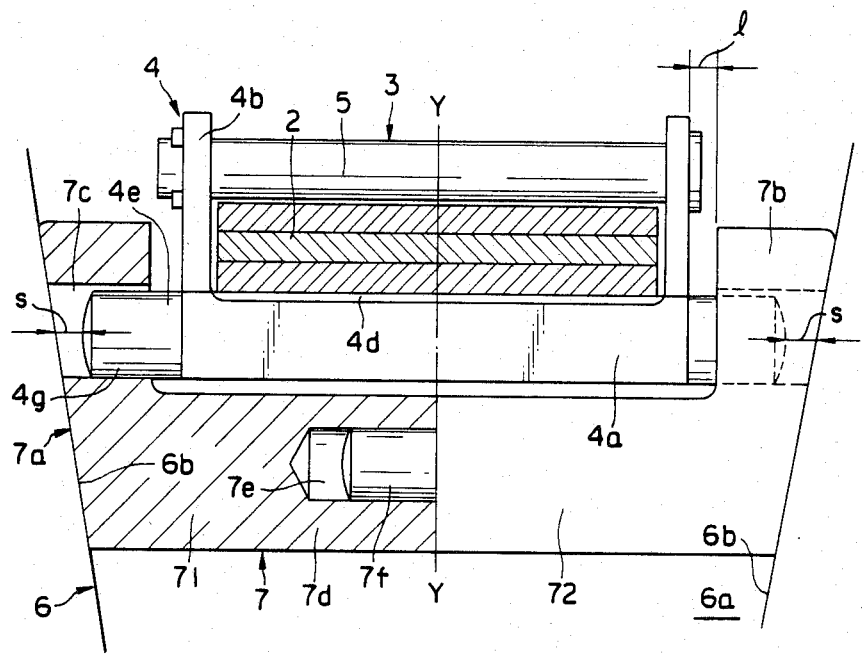
FIG. 20 is a cross-sectional view showing another embodiment of the V-belt assembly according to the present invention.

In the V-belt assembly shown in FIG. 20, the distance l between the side leg 4b of the U-shaped member 4 and the side leg 7b of the transmission piece 7 is selected smaller than that s between the end of the pivotal projection 4e of the U-shaped member 4 and the side wall 6b of the V-shaped groove 6a of V-belt wheel 6. Further, the pivotal projection 4e is formed with an antifriction material layer 4g constituted from iron sulfide by electrolytic immersion process.

Figure 21:
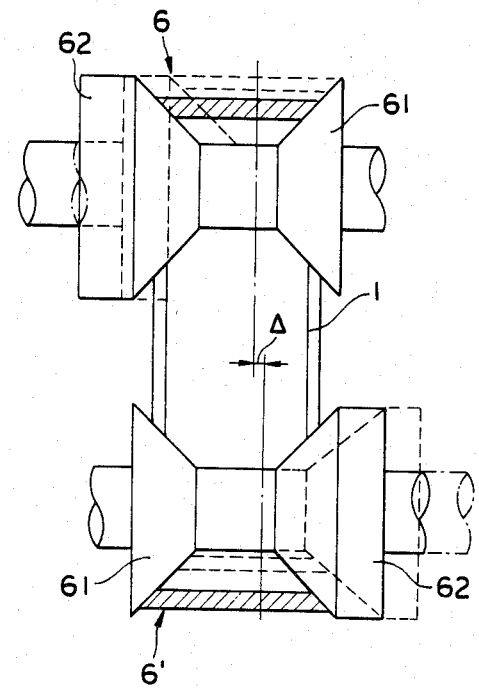
FIG. 21 is a schematic view showing the deviation of the center of the endless belt in speed change.

Now referring to FIG. 7, the movable disk 62 of the drive belt wheel 6 is displaced rightward for example for speed change and the V-belt assembly 1 is displaced toward the fixed disk 61 at the opposite side. Thus, the movable disk of the driven belt wheel 6' is pushed out by the wedging action produced by the tension of the belt assembly 1 to move rightward. Thus the pitch diameter of the drive belt wheel 6 of the velt assembly 1 is increased and the pitch diameter of the driven belt wheel 6' is decreased. Then, the longitudinal center of the belt assembly wound around the drive belt wheel 6 is deviated from that around the driven belt wheel 6' to produce so-called center deviation which is shown in the schematic illustration of FIG. 21.

It is now assumed that the ratio e of the pitch diameter of the drive belt wheel 6 to that of the driven belt wheel 6' is 1, i.e. both pitch diameters are equal to each other and no center deviation is present. When both pitch diameters are varied with speed change, the center deviation $\Delta$ becomes as follows;

$$\Delta = \frac{-De = 1^2}{\pi \cdot D_s} \cdot \left(\frac{e-1}{e+1}\right)^2 \cdot \tan \alpha$$

where $De=1$ is the pitch diameter of both belt wheels 6, 6' in $e=1$. $Ds$ is the distance between the shafts of both belt wheels 6, 6' and $\alpha$ is conical angle of disks 61, 62.

When the center deviation is thus produced in the range of both belt wheels 6, 6', the transmission pieces 7 will be deviated sideways relative to each other by the center deviation in the straight range between both belt wheels 6, 6'.

However, in the belt assembly shown by FIG. 20, since the transmission piece 7 is to move smoothly sideways relative to the U-shaped member 4 due to the distance l between the pivotal projection 4e covered by the antifriction material layer 4g, the side leg 4b of the U-shaped member 4 and the side leg 7b of the transmission piece 7, the U-shaped member 4 itself is not deviated sideways even if the transmission piece 7 is deviated sideways by said center deviation, so that the side leg 4b does not wear away or break down the side edge of the endless belt 2 by rubbing the same. Further, since said distance l is set smaller than the distance s between the end of the pivotal projection 4e and the side wall 6b of the V-shaped groove 6a of the V-belt wheel 6, when the U-shaped member 4 moves sideways relative to the transmission piece 7, an advantage is given in that the end of the pivotal projection 4e does not abut against the side wall 6b of the V-shaped groove of V-belt wheel to wear away or damage it.

Further in the V-belt assembly shown by FIG. 20, to form the antifriction material layer 4g on the pivotal projection 4e, a salt bath of sulfuric compound (KSCN and NaSCN) is maintained at 185°-195° C., and the pivotal projection 4e of the U-shaped steel member 4 is immersed into the bath for about 10 minutes for electrolytic process so that several $\mu$m of FeS layer is formed on the surface of the projection e as the antifriction material layer.

Figure 22:
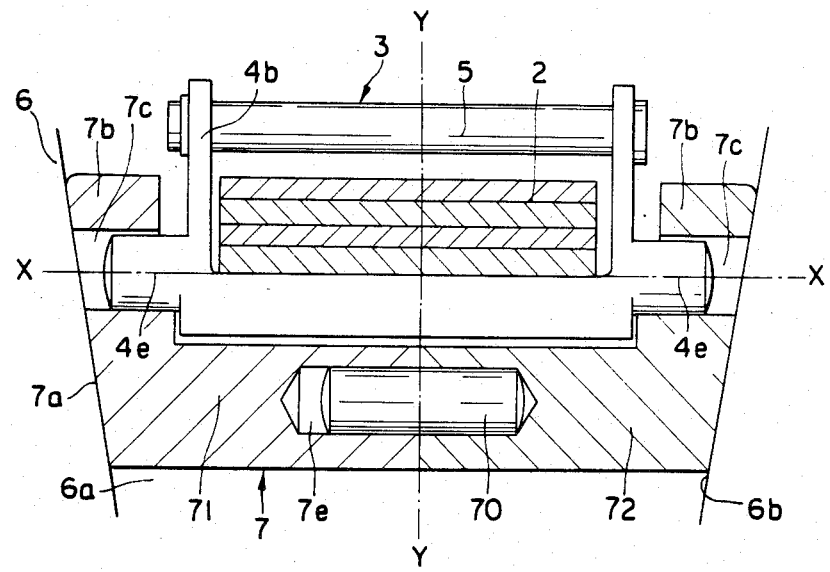
FIG. 22 is a cross-sectional view showing another embodiment of the V-belt assembly according to the present invention.

In the V-belt assembly of FIG. 22, the axis X—X of the pivotal projection 4e is on the extension of the upper surface 4d of the bottom side 4a. The transmission piece 7 and the U-shaped member 4 just before included in the V-belt driven wheel 6' have to slant to be directed toward the center of the V-belt driven wheel 6' as shown in FIG. 8. In the V-belt assembly of FIG. 22, however, the rotation center of the transmission piece 7 together with that of the U-shaped member 4 coincides with the lower surface of the endless belt 2 so that these parts 7, 4 in the slanting motion little move relative to the endless belt 2 and thus wear due to the mutual friction is to be avoided. Also the slanting transmission piece 7 or U-shaped member 4 are to smoothly slant without pushing up the endless belt 2 so that any large bending stresses are not applied to the endless belt 2. Thus, the inclusion loss in the V-belt wheel is reduced.

Figure 23:
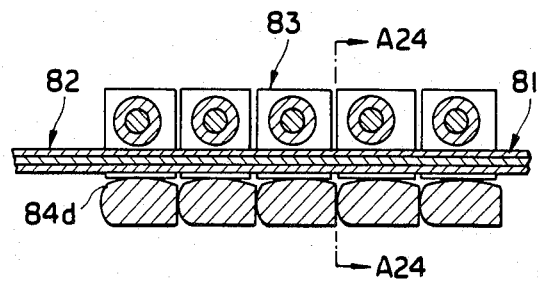
FIG. 23 is a sectional view taken along line A23—A23 in FIG. 24 showing a still further embodiment of the V-belt assembly according to the present invention as viewed from the side.
Figure 24:
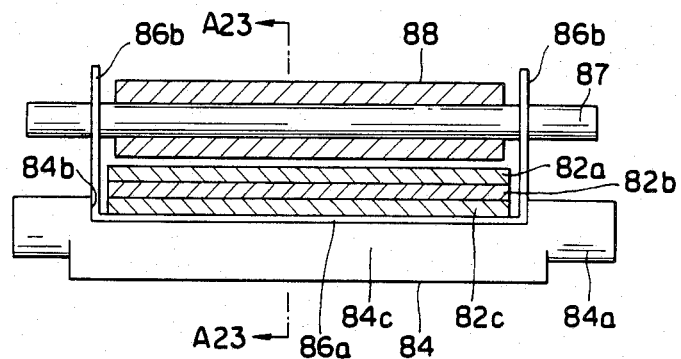
FIG. 24 is a sectional view taken along line A24—A24 in FIG. 23.
Figure 25:
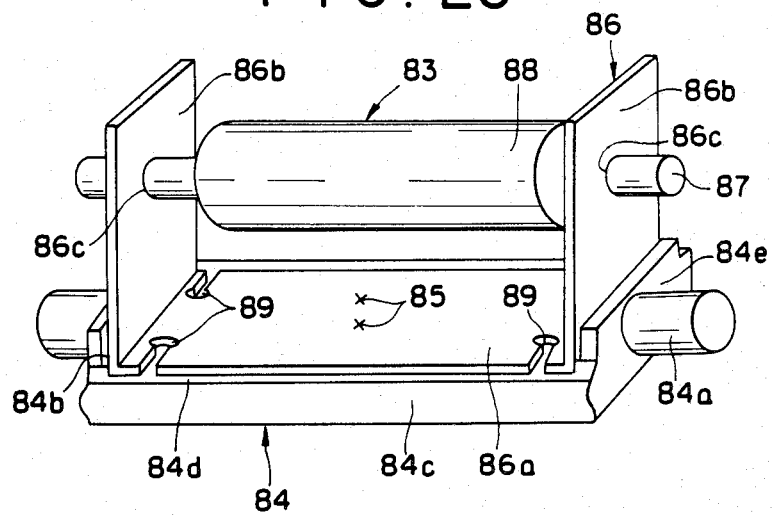
FIG. 25 is a perspective view showing the suspension member in FIG. 24.

In a V-belt assembly 81 of FIGS. 23 to 27, on a flexible endless belt 82 consisting of a plurality of metal or cloth strip layers for example are mounted a plurality of frame type suspension members 83 surrounding the endless belt and movable in the longitudinal direction thereof. These suspension members 83 are constituted respectively from a rigid metal cross member 84 having on both sides pivotal projections 84a, an U-shaped leaf spring member 86 fitted in a recess 84b of the cross member 84 and having a bottom side 86a spot welded 85 at the approximately central portion of a bottom side 84c and a pin 87 extending through holes 86c in both side legs 86b of the U-shaped leaf spring member 86, and a roller 88 is supported rotatably on the pin 87. As is apparent from FIG. 25, T-shaped slits 89 are provided in the front and rear edges near both ends of the bottom side 86a of the U-shaped leaf spring member 86. An upper surface 84d of the bottom side 84c of the cross member 84, i.e. the side near the endless belt 82, as is apparent from FIG. 23, is rounded convexly upward in the longitudinal direction of the endless belt 82. And when the suspension member 83 is swung about the axis parallel to the pin 87, the bottom side 86a of the leaf spring member 86 is also bent along the upper of the leaf spring member 86 is a surface 84d of the cross member 84 due to the slits 89 without pushing up or bending the endless belt 82. Since the slit 89 is T-shaped, the bottom side 86a of the leaf spring member 86 is not split in the bending of the bottom side 86a. The pivotal projections 84a on both sides of the cross member 84 fit in holes 91b in both side legs 91a of an approximately U-shaped transmission piece 91 engaging a V-shaped groove 90a of a V-belt wheel 90 to support swingably the suspension member 83. As is apparent from the drawing, the diameter of the hole 91b is made slightly larger than that of the pivotal projection 84a to produce some play. This transmission piece 91 is also made of rigid metal or ceramic. As is apparent from FIG. 26, the distance between both ends of pivotal projections 84a is smaller than that between side walls 91c of the transmission piece 91 in the range of the support, i.e. the range of the holes 91b. Thus, the suspension member 83 is not in contact with the V-belt wheel 90. As shown in FIG. 27, the thickness d of the transmission piece in the longitudinal direction of the endless belt 82 converges from at least the range of the holes 91b toward the center side of curvature of the endless belt 82. The U-shaped transmission piece 91 is divided into two L-shaped pieces 121, 122 by the longitudinal center plane Y—Y of the endless belt 82, and a connecting pin 92, for example a spring pin, is press fitted into blind holes 91e extending from the dividing plane Y—Y to both pieces 121, 122 in a bottom side 91d of the U-shaped transmission piece 91 to constitute the U-shaped transmission piece 91. The cross member 84 of the suspension member 83 is formed on the bottom side 84c with a contact lug 84e slightly projecting from the transmission piece 91 one way or two ways in the longitudinal direction of the endless belt 82, and thus the adjacent cross members 84 under the straight condition in the longitudinal direction of the endless belt 82 is in contact with each other through the contact lug 84e so that the transmission pieces 91 are not in contact with each other.

Figure 28:
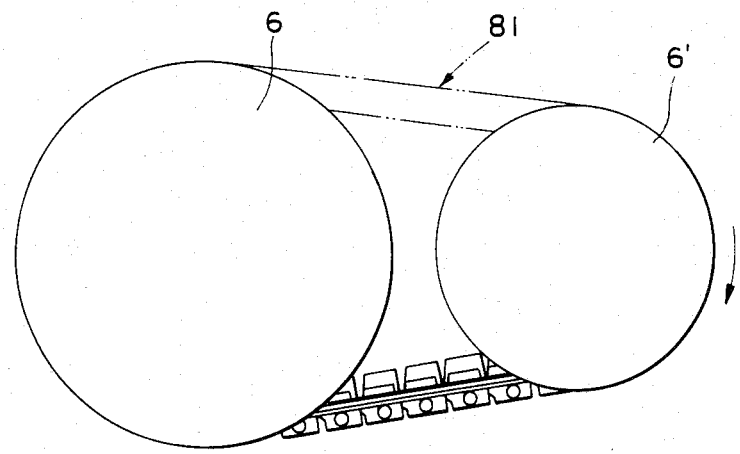
FIG. 28 is a view showing the V-belt assembly in FIG. 23 which is trained over the belt wheel.
Figure 29:
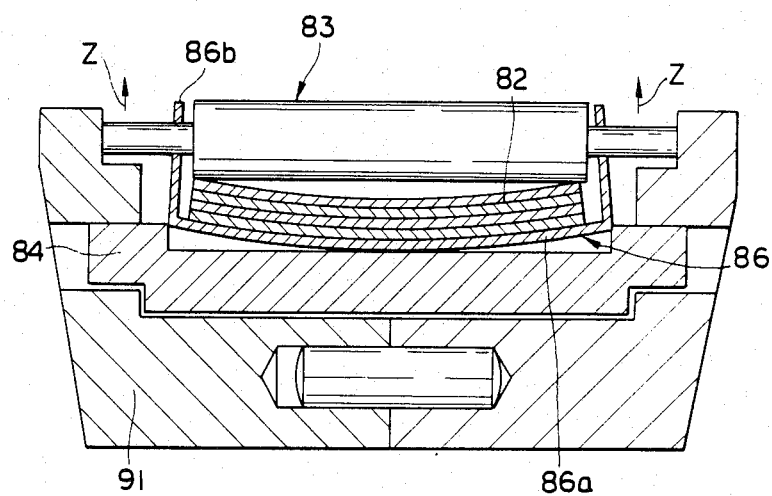
FIG. 29 is a view showing the flexed U-shaped leaf spring member of the embodiment of FIG. 23.

Referring to advantageous features of the V-belt assembly shown in FIGS. 23 to 27, since the U-shaped leaf spring member 86 is secured fixedly to the cross member 84 only on a central portion 85 of the bottom side 86a, the bottom side 86a of U-shaped leaf spring member 86 is forcibly upward concavely bent by utilizing that the U-shaped leaf spring member 86 is withdrawn from the cross member 84 upward in the direction of arrow Z in a portion of the belt assembly 81 leaving from the belt wheel 6' as shown in FIGS. 28 and 29, so that the endless belt 82 above the bottom side 86a is bent about the longitudinal center plane Y—Y to bring the endless belt to the center of the suspension member 83. Thus, the side edges of the endless belt 82 will not be in contact with the side legs 86b of the U-shaped leaf spring member 86 so that wear due to the contact is prevented to improve further the durability of the endless belt 82. The constitution of the round convex upper surface 84d of the cross member 84 and the presence of the slits 89 in the bottom side 86a of the leaf spring member 86 prevent the endless belt 82 from being bent by the swing of the suspension member 83 as mentioned above.

Figure 30:
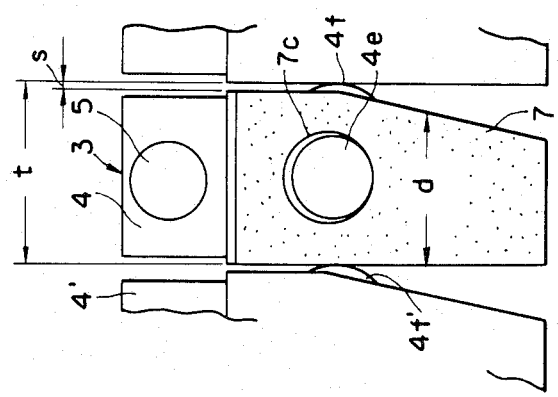
FIG. 30 is a side view showing another embodiment of the V-belt assembly according to the present invention.

In FIG. 30, it is shown that the U-shaped member 4 has the actual effective thickness t in the longitudinal direction of the endless belt 82 and the transmission piece 7 has the actual effective thickness minus the projecting amount s of the contact lug 4f.

Figure 31:
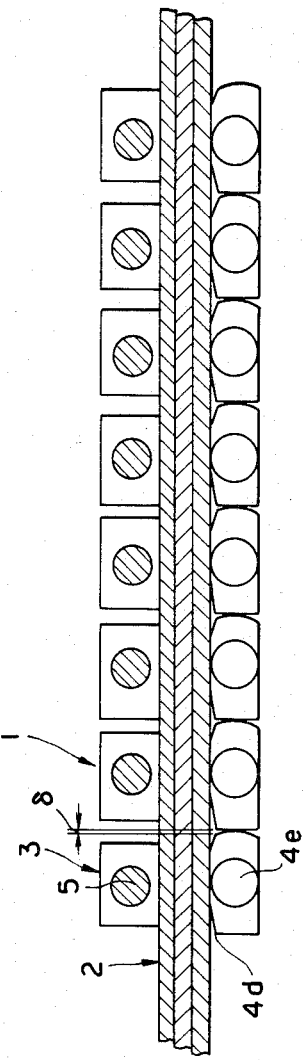
FIG. 31 is a view showing errors in the V-belt assembly when it is assembled.
Figure 32:
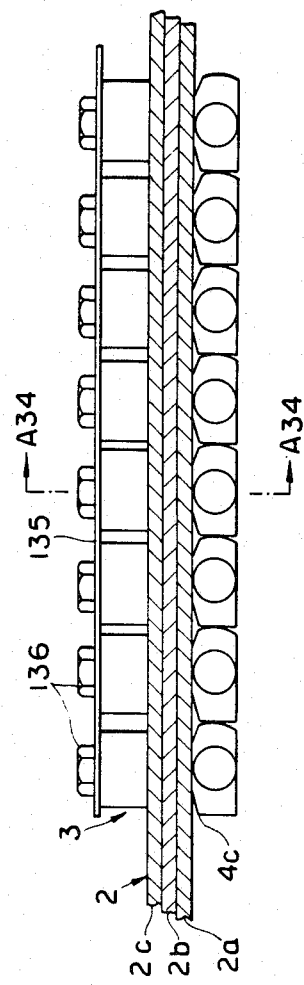
FIG. 32 is a sectional view showing another embodiment of the V-belt assembly according to the present invention as viewed from the side.

Now, to assemble the V-belt assembly 1 by the use of the U-shaped member 4, the suspension members 3 are mounted on the endless belt 82 to be in contact with each other as shown in FIG. 31. A small gap δ will be produced between the suspension members 3 by dimensional tolerance. The presence of this gap δ produces noises and wear generated by the collision of the suspension members 3 themselves to reduce the durability of the V-belt assembly. Thus, according to the present invention, the U-shaped member is used which enlarges the thickness in the longitudinal direction of the endless belt by that corresponding to the gap δ. Thus, the U-shaped member 4', may be used which has the contact lug 4f' projecting as much as this dimension δ (FIG. 30). Further this gap δ may be offset by at least two U-shaped members instead of one. The U-shaped member having the contact lug of the necessary projecting dimension to offset the presumed maximum gap may be further prepared to reduce the projecting dimension to a desired one by cutting the contact lug in relation to the gap produced actually. Since the gap between the suspension members themselves on the endless belt 82 are to be eliminated by the use of the large thickness of the U-shaped member 4, particularly large contact lug 4f, the possibility of noise generation and wear due to the mutual collision of the suspension members is advantageously eliminated.

Figure 36:
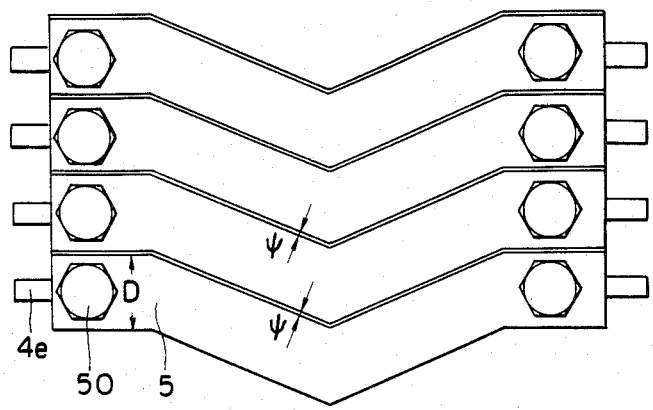
FIG. 36 is a plan view showing the spanning plate member in FIG. 32.

In the V-belt assembly of FIGS. 32 to 36, the suspension member 3 is surrounded by a spanning angle plate member 135 spanning both side legs 4b and projecting in the longitudinal direction of the endless belt 82. This plate member 135 is secured fixedly to the ends of the side legs 4b by bolts 136. The width D of the spanning plate member 135 is selected to be equal to or slightly smaller than the thickness d of the transmission piece 7 so that the gap ψ (FIG. 36) between the spanning plate members 135 themselves of the adjacent suspension members 3 in the longitudinal direction of the endless belt 82 is approximately equal to the gap m (FIG. 35) between the transmission pieces 7 themselves in the same direction. The front and rear spanning plate members 135 engage each other in the longitudinal direction of the endless belt 82 as shown in FIG. 36 so that the adjacent U-shaped members 4 in the longitudinal direction of the endless belt 82 are not deviated laterally relative to each other to provide a large advantage in that the side legs 4b of the U-shaped member 4 is not in contact with the side edges of the endless belt 82 to wear away the endless belt 82.

Figure 37:
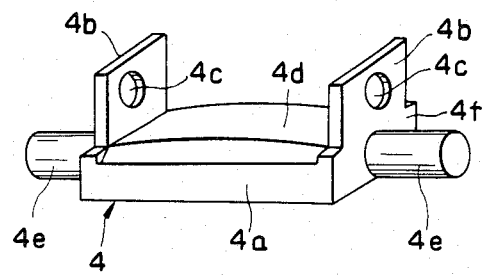
FIG. 37 is a perspective view showing the U-shaped member of another embodiment according to the present invention.
Figure 38:
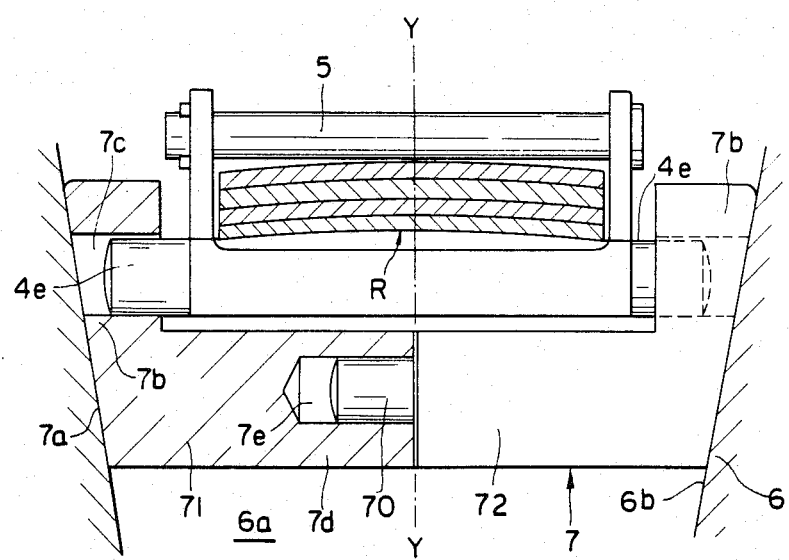
FIG. 38 is a cross-sectional view showing the V-belt assembly having the U-shaped member in FIG. 37.

In the V-belt assembly of FIGS. 37 and 38, the upper surface of the bottom side 4a, i.e. surface 4d contacting with the endless belt 82 in the U-shaped member 4 is bent convexly toward the center of the bottom side 4d with a specified curvature R, for example 100–3000 mm of radius of curvature and further rounded in the longitudinal direction of the endless belt 82 similarly to the case of FIG. 2 as is apparent from FIGS. 37 and 38.

In the V-belt assembly of FIGS. 37 and 38, the upper surface 4d of the bottom side 4a of the U-shaped member 4 is bent convexly toward the center of the bottom side 4a in the form of a crown so that the longitudinal center plane Y—Y of the endless belt 82 tends to occupy the highest position of the curved surface according to the principle that a plane belt is wound around the belt wheel to bring the longitudinal center to the highest point or the largest diameter portion of the crown. Thus, the side edges of the endless belt 82 are not in contact with the side legs 4b of the U-shaped member 4 to prevent the wear due to the contact and thus improve the durability of the endless belt. Further, since the upper surface 4d is rounded also in the longitudinal direction of the endless belt 82, the supension member 3 does not push up the endless belt 82 to bend it locally even if the suspension member 3 is swung about the axis perpendicular to the longitudinal direction of the endless belt 82.

It will be apparent to those skilled in the art that various modifications and variations may be made in the elements of the invention without departing from the scope or spirit of the invention.

What is claimed is:

1. A V-belt assembly for transmitting power, comprising:
    a V-belt assembly trained over a V-belt wheel;
    a flexible endless belt;
    a plurality of suspension members slidably mounted on the endless belt in a longitudinal direction thereof and which further comprises a pin member and a U-shaped member connected to said pin thereof; and
    a plurality of U-shaped transmission pieces separated from said U-shaped member, having side surfaces corresponding to side walls of a V-shaped groove of the V-belt wheel and supported swingably by the suspension members, respectively.

2. A V-belt assembly for transmitting power as defined in claim 1, wherein said pin extends through opposite leg portions of the U-shaped member and said U-shaped member includes pivotal projections projecting sideways from opposite sides for supporting swingably each of said U-shaped transmission pieces.

3. A V-belt assembly for transmitting power as defined in claim 2, wherein a distance between the ends of said pivotal projections of each of said suspension members is smaller than that between opposite side surfaces of the transmission piece within a supporting range.

4. A V-belt assembly for transmitting power as defined in claim 2, wherein the transmission piece is provided with holes having a diameter slightly larger than that of said pivotal projection such that the transmission piece fits onto the pivotal projections through the holes with some play.

5. A V-belt assembly for transmitting power as defined in claim 1, wherein each of said suspension members has a contact lug slightly projecting from the transmission piece in the longitudinal direction of the endless belt within the range of a bottom side of the U-shaped suspension member.

6. A V-belt assembly for transmitting power as defined in claim 1, wherein the endless belt further comprises a strip consisting of at least one sheet of metal or cloth.

7. A V-belt assembly for transmitting power as defined in claim 1, wherein the suspension member and the transmission piece are made of rigid metal or ceramic.

8. A v-belt assembly for transmitting power as defined in claim 1, wherein a bottom side of the U-shaped suspension member contacting with the endless belt is rounded convexly in a longitudinal direction of the endless belt.

9. A V-belt assembly for transmitting power, comprising:
    a V-belt assembly trained over a V-belt wheel;
    a flexible endless belt;
    a plurality of suspension members slidably mounted on the endless belt slidably in the longitudinal direction thereof and which further comprises a pin member and a U-shaped member connected to said pin; and
    a plurality of U-shaped transmission pieces separated from said U-shaped member, having the side surfaces corresponding to side walls of a V-shaped groove of the V-belt wheel and supported swingably by the suspension members respectively;
    wherein the transmission piece is divided by a longitudinal center plane of the endless belt into first and second L-shaped pieces connected to each other on a bottom side of the U-shaped transmission piece.

10. A V-belt assembly for transmitting power as defined in claim 9, wherein said first and second pieces have respectively a blind hole and a projection extending coaxially from butt surfaces in a bottom side of the U-shaped transmission piece, the projection of said first piece being press fitted into the hole of the second piece to thereby constitute the transmission piece.

11. A V-belt assembly for transmitting power as defined in claim 10, further comprising a spring pin inserted into the blind hole extending from the side surface of said first piece to the second piece inthe bottom side of the U-shaped transmission piece.

12. A V-belt assembly for transmitting power as defined in claim 11, wherein a length of dimension of the spring pin is longer than that of the blind hole.

13. A V-belt assembly for transmitting power as defined in claim 10, further comprising a socket bolt inserted into the blind hole extending from a side surface of first piece to said second piece on the bottom side of the U-shaped transmission piece.

14. A V-belt assembly for transmitting power as defined in claim 11 or 13, further comprising a ball for preventing drop-out is press fitted into the blind hole from the side surface of one piece.

15. A V-belt belt assembly for transmitting power as defined in claim 9, further comprising a connecting plate extending over and interconnecting the first and second pieces along the bottom side of the U-shaped transmission piece .

16. A V-belt assembly for transmitting power as defined in claim 9, further comprising a connecting plate extending over and interconnecting said first and second pieces along a bottom side of the U-shaped transmission piece and a common positioning pin inserted into blind holes coaxially extending from the butt surfaces of said first and second pieces in said bottom side.

17. A V-belt assembly for transmitting power as defined in claim 9, further comprising a connecting plate extending over and interconnecting said first and second pieces along a bottom side of the U-shaped transmission piece and a common positioning pin inserted into blind holes extending coaxially from the butt surfaces of said first and second pieces in said bottom side.

18. A V-belt assembly for transmitting power as defined in claim 9, wherein said first and second pieces are formed cylindrically in the bottom side of the U-shaped transmission piece within ranges of butt surfaces and incorporated into the transmission piece by press fitting said cylindrical pieces into a single connecting pipe.

19. A V-belt assembly for transmitting power as defined in claim 18, wherein said first and second pieces are respectively formed with annular shoulders as stoppers for specifying the depth of press fit.

20. A V-belt belt assembly for transmitting power, comprising:
a V-belt assembly trained over a V-belt wheel;
a flexible endless belt;
a plurality of frame type suspension members mounted on the endless belt slidably in the longitudinal direction thereof and which further comprises a pin member and a U-shaped member connected to said pin; and
a plurality of U-shaped transmission pieces, separated from said U-shaped member, having side surfaces corresponding to the side walls of a V-shaped groove of the V-belt wheel and supported swingably by the suspension members respectively;
wherein a bottom side of each of said suspension members further comprises on a first end face with a projection and on a second end face side engaging means engaging at least both sides of the projection.

21. A V-belt assembly for transmitting power as defined in claim 20, wherein the side engaging means on the second end face of the bottom side of the suspension member further comprises a projection engaging opposite sides of a second projection on said first end face.

22. A V-belt assembly for transmitting power as defined in claim 20, wherein an end of the projection on said first end face of the bottom side of the suspension member is rounded about the axis parallel to a bottom side and the side engaging means on the second end face further comprises a flat-bottomed recess formed therein and wherein said projection is positioned in the recess.

23. A V-belt assembly for transmitting power as defined in claim 20, wherein the projection on the bottom side of the suspension member is located in a front portion of an advancing direction of the suspension member and the side engaging means is located in the rear.

24. A V-belt assembly for transmitting power comprising:
a V-belt assembly trained over a V-belt wheel;
a flexible endless belt;
a plurality of frame type suspension members surrounding the endless belt slidably in the longitudinal direction thereof; and
a plurality of U-shaped transmission pieces separated from said suspension members, supported swingably by said suspension members respectively and capable of engaging a V-shaped groove of the V-belt wheel;
wherein each of said suspension members further comprises a U-shaped member and a pin extending through opposite side legs of the U-shaped member, a pivotal projection projecting sideways from opposite sides of the U-shaped member fitting holes in said side legs of the transmission piece to support swingably the transmission piece wherein the distance between the side legs of the U-shaped member and the transmission piece is smaller than that between an end portion of the pivotal projection of the U-shaped member and a side wall of the V-shaped groove of the V-belt wheel.

25. A V-belt assembly for transmitting power as defined in claim 24, further comprising an antifriction material layer formed on the pivotal projection.

26. A V-belt assembly for transmitting power as defined in claim 25, wherein antifriction material further comprises iron sulfide.

27. A V-belt assembly for transmitting power, comprising:
a V-belt assembly trained over a V-belt wheel;
a flexible endless belt;
a plurality of frame type suspension members surrounding the endless belt slidably in the longitudinal direction thereof; and
a plurality of U-shaped transmission pieces separated from said suspension members, supported by said suspension members respectively and which engage a V-shaped groove of the V-belt wheel;
wherein each of said suspension members further comprises a U-shaped member and a pin extending through opposite side legs thereof and a pivotal projection projecting sideways from both sides of said side legs of the U-shaped member for supporting the transmission piece and wherein axes of said pivotal projection are located on an extension of a contacting surface of a bottom side of the U-shaped member.

28. A V-belt assembly for transmitting power as defined in claim 27, wherein the endless belt contacting surface of the bottom side of the U-shaped member is rounded in the longitudinal direction of the endless belt.

29. A V-belt assembly for transmitting power comprising:
a V-belt assembly trained over a V-belt wheel;
a flexible endless belt;
a plurality of frame type suspension members movably surrounding the endless belt in the longitudinal direction thereof and which further comprises a pin member and a U-shaped member connected to said pin; and
a plurality of U-shaped transmission pieces separated from said U-shaped members, supported swingably by these suspension members and which engage a V-shaped groove of the V-belt wheel;
wherein each suspension member further comprises a rigid cross member having pivotal projections for supporting the transmission piece at opposite sides, a U-shaped leaf spring member secured fixedly to the cross member on a bottom side and a pin extending through opposite side legs of the U-shaped leaf spring member and forming a frame for surrounding the endless belt together with the leaf spring member.

30. A V-belt assembly for transmitting power as defined in claim 29, further comprising means for fixing the U-shaped leaf spring member to the cross member by spot welding at an approximately central portion of the bottom side.

31. A V-belt assembly for transmitting power as defined in claim 29, wherein the U-shaped leaf spring member is provided in the front and rear edges near both ends of the bottom side and includes slits in the longitudinal direction of the endless belt.

32. A V-belt assembly for transmitting power as defined in claim 31, wherein said slits are T-shaped.

33. A V-belt assembly for transmitting power as defined in claim 29, further comprising a roller rotatably fitted onto the pin.

34. A V-belt assembly for transmitting power as defined in claim 29, wherein said cross member at a side near the endless belt is rounded convexly in the longitudinal direction of the endless belt.

35. A V-belt assembly for transmitting power comprising:
a V-belt assembly trained over a V-belt wheel;
a flexible endless belt;
a plurality of suspension members surrounding the endless belt slidably in the longitudinal direction thereof; and
a plurality of U-shaped transmission pieces separated from said suspension members, supported swingably by said suspension members respectively and which engage a V-shaped groove of the V-belt wheel;
wherein each suspension member further comprises a U-shaped member and a pin extending through opposite side legs of the U-shaped member and wherein at least one of the U-shaped members has a thickness larger than that of the remaining U-shaped members in the longitudinal direction of the endless belt.

36. A V-belt assembly for transmitting power as defined in claim 35, wherein the U-shaped member further comprises a plurality of contact lugs projecting from the transmission piece in the longitudinal direction of the endless belt within the range of the bottom side and wherein the contact lug of at least one U-shaped member projects larger than that of the remaining U-shaped members.

37. A V-belt assembly for transmitting power comprising:
a V-belt assembly trained over a V-belt wheel;
a flexible endless belt;
a plurality of frame type suspension members surrounding the endless belt slidably in the longitudinal direction thereof; and
a plurality of U-shaped transmission pieces separated from said suspension members, supported swingably by said suspension members respectively and which engage a V-shaped groove of the V-belt wheel;
wherein each suspension member further comprises a U-shaped member and a spanning angle plate member spanning opposite side legs of the U-shaped member and projecting in the longitudinal direction of the endless belt.

38. A V-belt assembly for transmitting power as defined in claim 37, further comprising means for fixing the spanning angle plate member to end portions of said side legs of the U-shaped member.

39. A V-belt assembly for transmitting power as defined in claim 37, wherein the suspension member further comprises a contact lug projecting from the transmission piece in the longitudinal direction of the endless belt within the range of the bottom side of the U-shaped suspension member.

40. A V-belt assembly for transmitting power as defined in claim 37, wherein a width dimension of the spanning plate member in the longitudinal direction of the endless belt is equal to or slightly smaller than that of the transmission piece in the same direction.

41. A V-belt assembly for transmitting power comprising:
a V-belt assembly trained over a V-belt wheel;
a flexible endless belt;
a plurality of frame type suspension members surrounding the endless belt slidably in the longitudinal direction thereof; and
a plurality of U-shaped transmission pieces separated from said suspension members, supported swingably by said suspension members respectively and which engage a V-shaped groove of the V-belt wheel;
wherein each suspension member further comprising a U-shaped member and a pin extending through opposite side legs of the U-shaped member and wherein a surface of a bottom side of the U-shaped member facing the endless belt is bent convexly toward the central portion of the bottom side with a predetermined curvature.

42. A V-belt assembly for transmitting power as defined in claim 41, wherein a radius of curvature of the bent surface is within the range of 100–300 mm.

43. A V-belt assembly for transmitting power as defined in claim 41, whereinthe surface of the bottom side of the U-shaped member facing the endless belt is rounded in the longitudinal direction of the endless belt.

* * * * *